US008118266B2

(12) United States Patent
Zheng et al.

(10) Patent No.: US 8,118,266 B2
(45) Date of Patent: Feb. 21, 2012

(54) APPARATUS FOR GENERATING POSITION SIGNALS FOR RAIL-BOUND VEHICLES, IN PARTICULAR MAGNETIC LEVITATION VEHICLES

(75) Inventors: Qinghua Zheng, Taufkirchen (DE); Juergen Frantzheld, Munich (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 289 days.

(21) Appl. No.: 12/159,723

(22) PCT Filed: Jan. 10, 2007

(86) PCT No.: PCT/DE2007/000045
§ 371 (c)(1),
(2), (4) Date: Jun. 30, 2008

(87) PCT Pub. No.: WO2007/085224
PCT Pub. Date: Aug. 2, 2007

(65) Prior Publication Data
US 2009/0050751 A1  Feb. 26, 2009

(30) Foreign Application Priority Data

Jan. 24, 2006 (DE) .......................... 10 2006 003 679

(51) Int. Cl.
*B61L 23/34* (2006.01)
(52) U.S. Cl. ..................... 246/122 R; 104/281
(58) Field of Classification Search ............... 246/122 R; 104/281–284, 290, 292
See application file for complete search history.

(56) References Cited

U.S. PATENT DOCUMENTS

| 4,532,511 | A  | * | 7/1985  | Lemelson ................ 340/933 |
| 5,433,155 | A  | * | 7/1995  | O'Neill et al. ............ 104/282 |
| 5,699,986 | A  | * | 12/1997 | Welk ....................... 246/125 |
| 6,318,678 | B2 | * | 11/2001 | Ireland ..................... 246/122 R |
| 6,360,998 | B1 | * | 3/2002  | Halvorson et al. ........ 246/122 R |

(Continued)

FOREIGN PATENT DOCUMENTS

DE   2 222 266    11/1973

(Continued)

OTHER PUBLICATIONS

Zevrail Glasers Annalen, Special Issue "Transrapid", Oct. 2003, pp. 88-94.

(Continued)

*Primary Examiner* — S. Joseph Morano
*Assistant Examiner* — Jason C Smith
(74) *Attorney, Agent, or Firm* — Michael J. Striker

(57) ABSTRACT

An apparatus generates position signals to indicate the position of a rail-bound vehicle along a travel way throughout which travel way many markings are located. The apparatus includes at least one sensor located on the vehicle for scanning the markings and outputting signals and an evaluation unit that is connected to the sensor for generating the position signals by evaluating the signals generated by the sensor by scanning the markings. When the vehicle passes a marking, the sensor outputs a "marking present" signal and otherwise outputs a "marking absent" signal. The vehicle has a receiver of a navigation system that is connected to the evaluation unit and outputs current location signals. The evaluation unit is connected to a memory device (20) for storing position data associated with the markings, where, upon receiving each "marking present" signal, the evaluation unit outputs a position signal associated with the marking based on a comparison of the current location signal and the memory-stored position data.

6 Claims, 4 Drawing Sheets

U.S. PATENT DOCUMENTS

Figure 1:
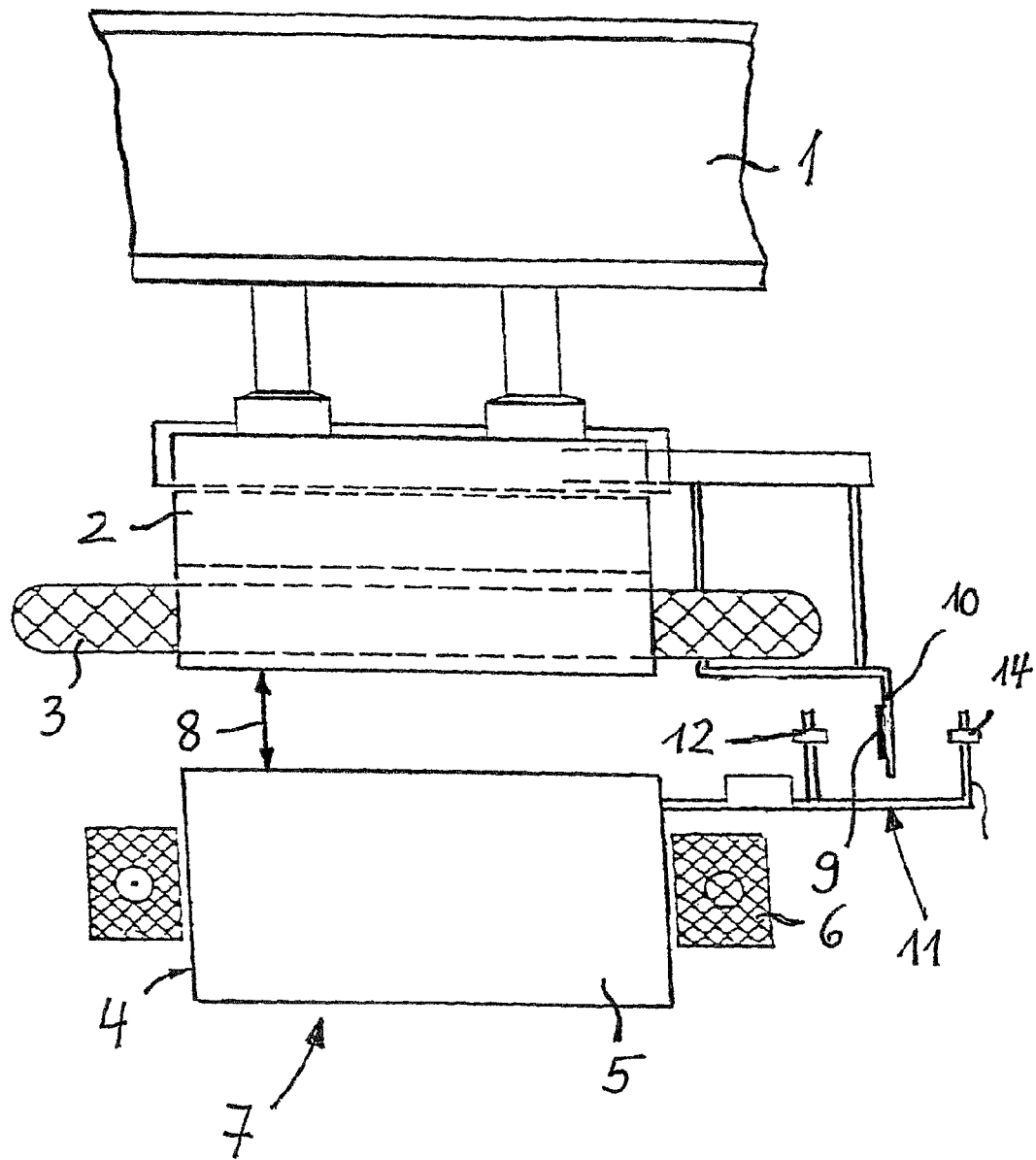

| | | | |
|---|---|---|---|
| 6,729,584 B2 * | 5/2004 | Ireland | 246/122 A |
| 2004/0060471 A1 * | 4/2004 | Fahrion | 104/281 |
| 2007/0192000 A1 | 8/2007 | Ellmann et al. | |
| 2009/0050751 A1 * | 2/2009 | Zheng et al. | 246/122 R |

FOREIGN PATENT DOCUMENTS

| | | |
|---|---|---|
| DE | 27 50 048 | 5/1979 |
| DE | 33 03 961 | 8/1983 |
| DE | 102 32 720 | 2/2004 |
| DE | 10 2004 015 496 | 10/2005 |
| FR | 2 667 694 | 4/1992 |
| GB | 1 245 534 | 9/1971 |

OTHER PUBLICATIONS

"Magnetbahn Transrapid—Die Neue Dimension Des Reisens" Hestra-Verlag Darmstadt, pp. 60-88.

* cited by examiner

List of the Distribution of the Marking

| Marking Number | Track Number | Kilometer count | Position |
|---|---|---|---|
| 1. | ABC_1 | l_1 | x_1, y_1 |
| . | . | . | . |
| k. | . | l_k | x_k, y_k |
| . | . | . | . |
| N. | . | l_N | x_N, y_N |

APPARATUS FOR GENERATING POSITION SIGNALS FOR RAIL-BOUND VEHICLES, IN PARTICULAR MAGNETIC LEVITATION VEHICLES

The invention relates to an apparatus of the generic type defined by the preamble to claim 1.

Rail-bound vehicles, such as those in magnetic levitation railways, are often operated without drivers. In such cases, the control of the vehicles is done from a central control station, and the speed of the vehicles is fixedly specified for each location along the associated travel way. One prerequisite for driverless operation is the presence of an apparatus by means of which the current position of the vehicle can be monitored permanently and automatically.

In one known apparatus of this generic type (German Patent DE 33 03 961 C2 and German Patent Disclosure DE 10 2004 015 496 A1), measuring strips with markings are mounted along the travel way for this purpose. Each marking includes a piece of absolute position information in binary coded form and therefore indicates a precise position of the vehicle along the travel way. By scanning the measuring strip and decoding the data located on it with sensors installed on the vehicle and with evaluation units, position signals are obtained which are transmitted by radio to the central control station. Moreover, in magnetic levitation vehicles, which are operated with long-stator linear motors, the markings also provide information about the precise position of the exciter field, generated on the vehicle, for instance with the aid of load-bearing magnets, relative to the teeth and slots of the long stator. From this relative position information, the phase relationship of the m.m.f. wave that drives the vehicle and progresses in a longitudinal direction of the long stator is determined, in order to be able to develop stable thrust forces. Finally, the markings also provide time data that provide information pertaining to when any arbitrary location along the travel way is reached.

The described manner of generating the position signals has the disadvantage that the information on the measuring strips not only has to be recorded from the vehicles that are travelling at high speed but must also be decoded. The greater the number of bits required for the coding, the more serious is possible interference, such as noise. To do justice to all the demands, high operative effort and expense are therefore necessary to ensure a low incidence of interference. Moreover, the embodiment and assembly of the measuring strips is time-consuming and expensive.

Basically, position determination can be made not only with apparatuses of the type defined at the outset but also with the satellite-based navigation systems, which are known by such names as GPS (Global Positioning System), Galileo, Euteltracs, or the like, and which are already in operation or are planned to be in operation in the future. Until now, such navigation systems have had the disadvantage, however, that their measurement accuracy amounts to only several meters, at least for non-military navigation systems that are accessible to the public and can be used at reasonable expense. The current location signals obtained with these navigation systems can therefore not be used to ascertain the pole position in long-stator linear motors, because the long stators of these motors have tooth/nut pitches of 86 mm, for instance, and accuracies in the centimeter range would therefore be necessary.

With this as the point of departure, the technical object of the invention is to embody the apparatus of the generic type described at the outset such that it enables precise and largely interference-free locating by comparatively simple technical means.

The characteristics of the body of claim 1 serve to attain this object.

The invention has the substantial advantage that it enables a separation of the functions "record marking" and "identify marking". The markings therefore no longer need to furnish encoded position information; instead, they contain only simple information in the sense of yes/no information. Such information can be detected reliably and without major effort even from vehicles moving at high speed. Moreover, commercially available, economical receivers for the particular navigation system used can be employed, since extreme demands for accuracy need not be made of it.

Further advantageous characteristics of the invention will become apparent from the dependent claims.

The invention is described in further detail below in conjunction with the drawings in terms of exemplary embodiments.

Figure 2:
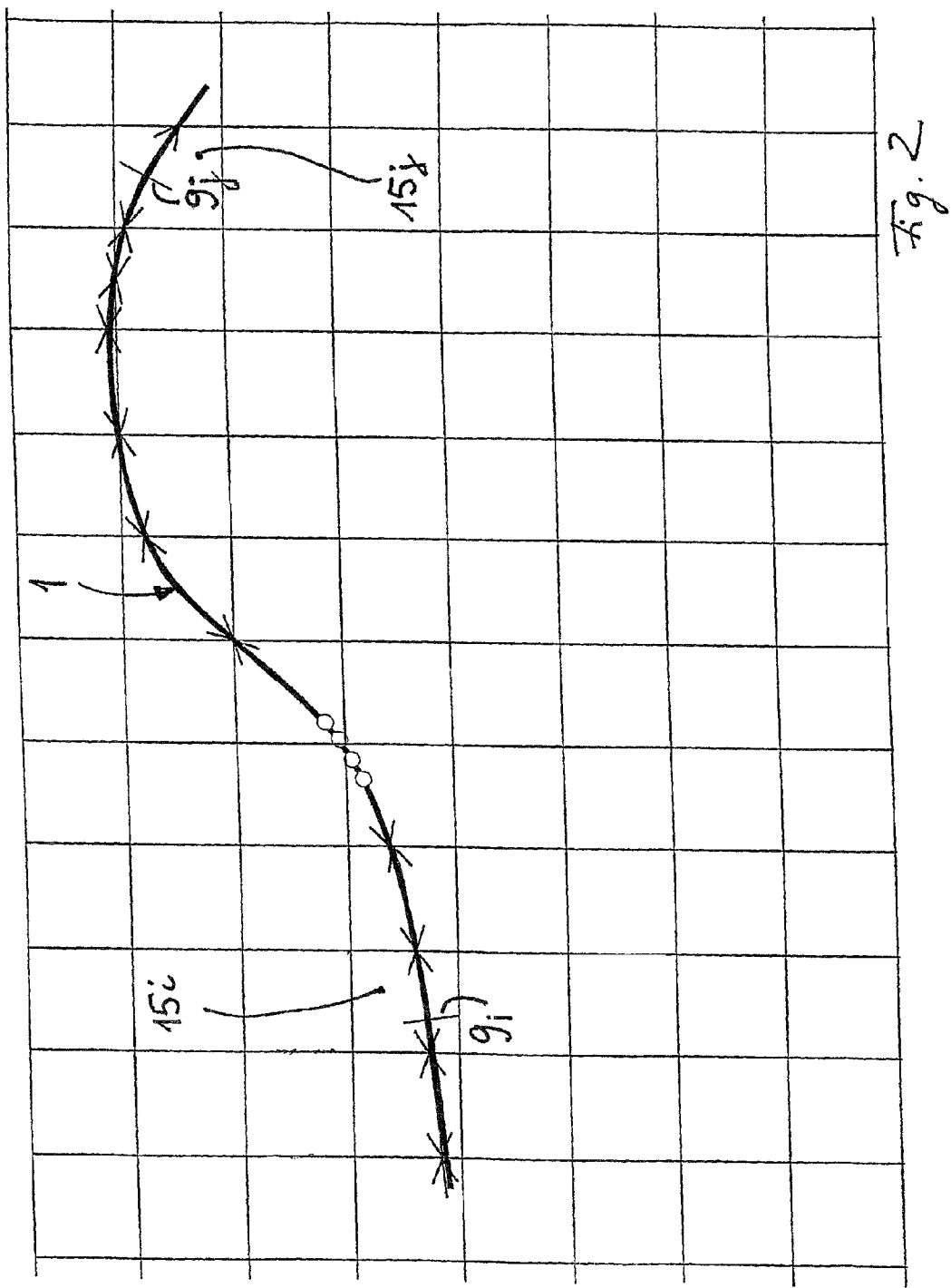
Figures 3, 4:
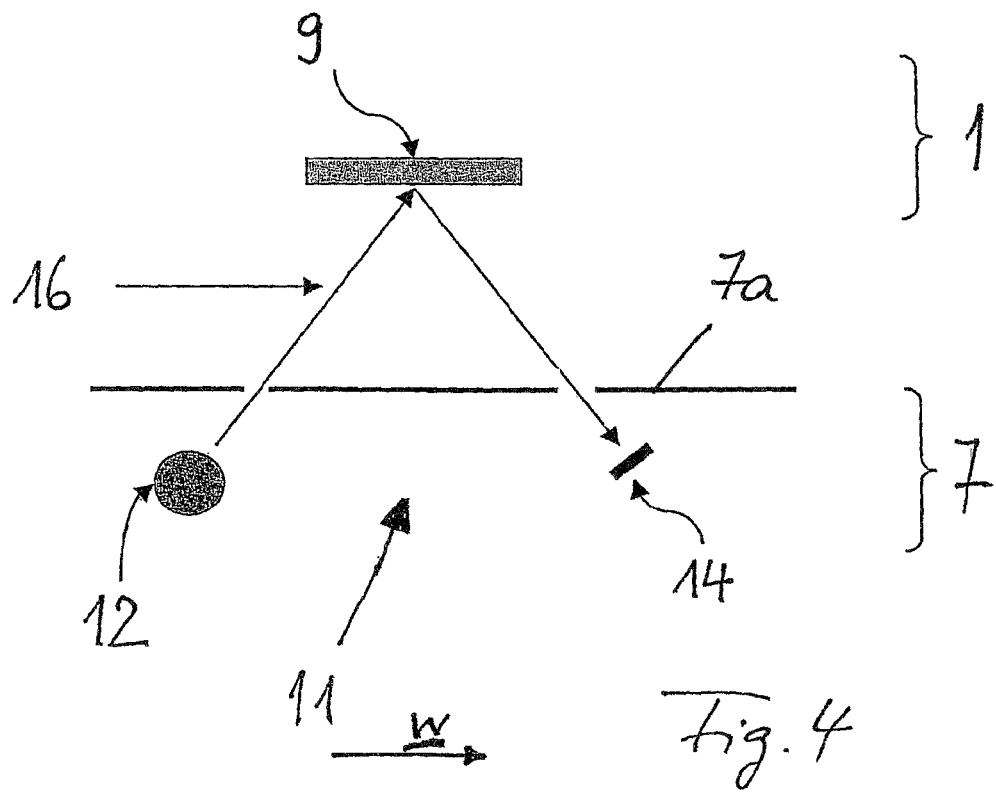
Figure 5:
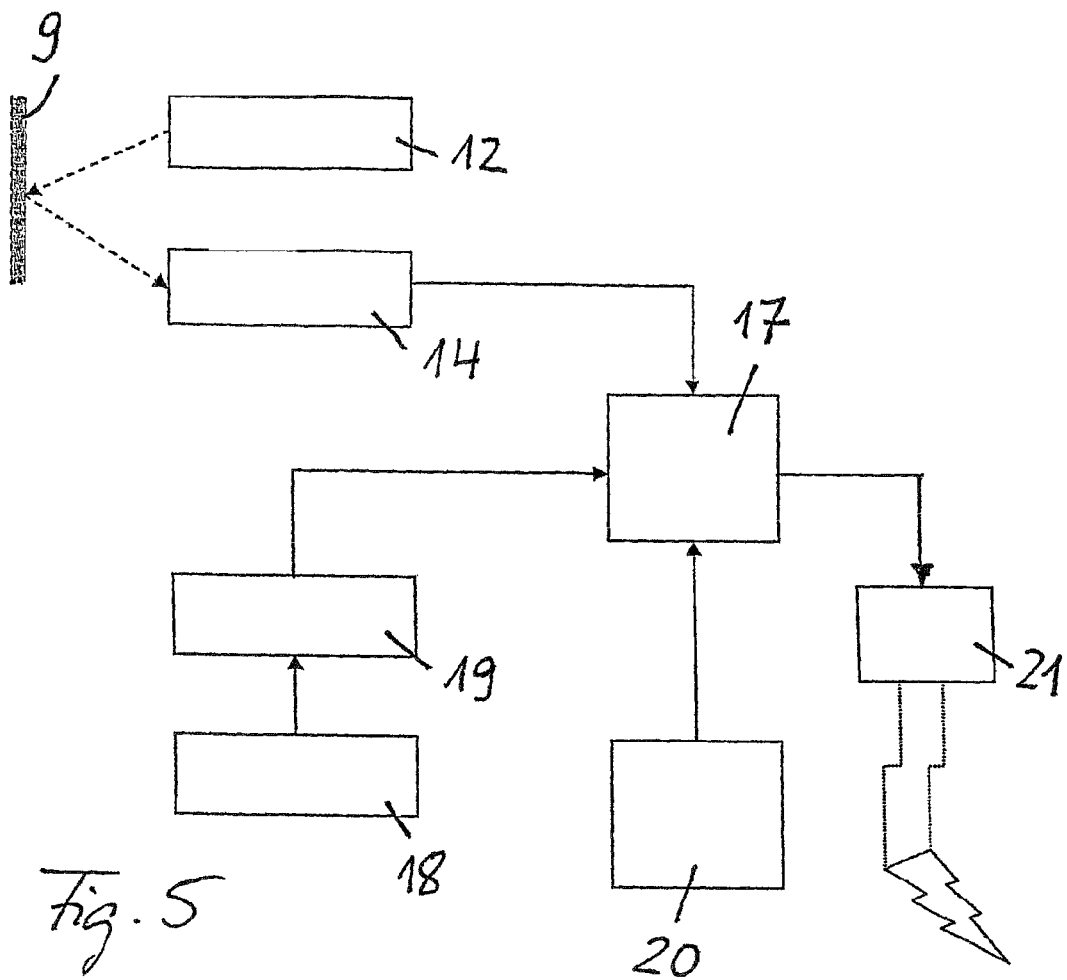
Figure 6:
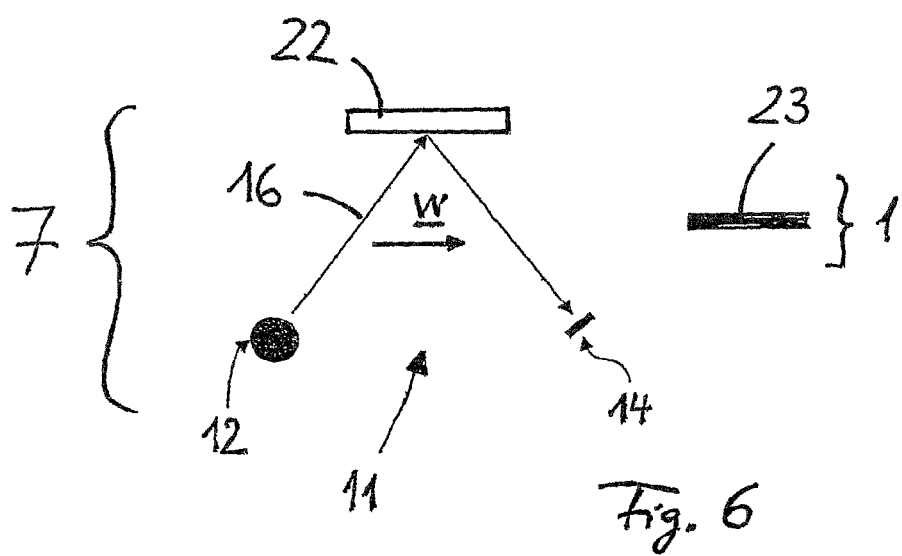

FIG. 1 shows a schematic vertical section through a magnetic levitation vehicle and a travel way for it;

FIG. 2 schematically shows the functional principle of an apparatus according to the invention, in a top view on a travel way provided with markings;

FIG. 3 schematically, by way of a list, shows the distribution and association of the markings mounted in the longitudinal direction of the travel way of FIG. 1;

FIG. 4 schematically shows a sensor for scanning markings mounted in the longitudinal direction of the travel way of FIG. 1;

FIG. 5 is a block circuit diagram of the apparatus according to the invention; and FIG. 6 shows a second exemplary embodiment for markings mounted on the travel way and a sensor suitable for scanning them.

The apparatus according to the invention will be described first generally taking as an example the generation of position signals for a rail-bound vehicle and especially taking the example of a magnetic levitation railway with a synchronous long-stator linear motor. For one skilled in the art, however, it is clear that the apparatus according to the invention can be employed in other rail-bound vehicle systems as well, with appropriate modification.

In FIG. 1, the magnetic levitation railway includes a travel way 1, on which a long stator 2, formed of individual stator packets and extending in the travel direction, of a long-stator linear motor is secured. The long stator 2 has alternating slots and teeth on its underside. A three-phase alternating current winding is placed in the slots and is supplied with rotary current of variable amplitude and frequency. The exciter field of the long-stator linear motor is generated by load-bearing magnets 4, which comprise cores 5 and windings 6 surrounding them and are mounted on a vehicle 7 and simultaneously serves the purpose of "load-bearing", in order to produce a load-bearing gap 8, which in operation is characteristic for the levitation state, between the travel way 1 or long stator 2 and the vehicle 7 or load-bearing magnet 4.

For ascertaining the particular vehicle position, markings 9 in the form of information transducers are mounted along the travel way. Each marking 9 preferably assumes a precisely defined location relative to the long stator 2, or to its slots and teeth, in order in a manner known per se to obtain an unambiguous association for determining the pole position. The markings 9 may for instance comprise electrically conductive layers that are mounted on disks or strips 10 of an electrically insulating material, and they are mounted for instance every 200 m along the travel way 1 in such a way that each individual marking 9 is unambiguously associated with one absolute position of the vehicle 7 along the travel way 1.

FIG. 1 moreover schematically shows a sensor 11, for instance inductive, which includes a high-frequency transmitter 12, located on one side of the markings 9, and a receiver 14, located on the other side of the markings 9, in order to detect the alternating successive disks and interstices between disks.

Apparatuses of the type described are known for instance from the documents mentioned at the outset, DE 33 03 961 C2 and DE 10 2004 015 496 A1, which are thus for the sake of simplicity expressly incorporated by reference with the subject of the present invention.

FIG. 2 shows as an example a detail of the travel way 1 in a top view. In the longitudinal direction of the travel way 1, two of the markings described, identified by reference numerals 9$i$ and 9$j$, are schematically mounted. FIG. 2 also shows a matrix whose lines correspond for instance to longitudes and latitudes, or analogously to the X and Y values of an imaginary Cartesian coordinate system. The matrix is defined by a satellite-based navigation system, such as the known GPS system operated by the United States. Since the demands for accuracy of the navigation system are comparatively slight for the purposes of the invention, it can for instance be assumed that the measuring accuracy amounts to from 5 m to 20 m. The matrix lines shown in FIG. 2, which define map quadrants 15$i$, 15$j$, grid areas, or the like, therefore have spacings from one another that can deviate by 5 m to 20 m, for instance, from the exact spacings.

According to the invention, the markings 9$i$, 9$j$ are located in a longitudinal direction of the travel way 1, and/or the map quadrants 15$i$, 15$j$ indicated in FIG. 2 are selected to be so large that each marking 9$i$, 9$j$ is located approximately in the middle of an associated map quadrant 15$i$, 15$j$, or conversely, each map quadrant 15$i$, 15$j$ includes at most precisely one associated marking 9$i$, 9$j$.

In FIG. 3, with the aid of a list, the meaning of the individual markings 9$i$, 9$j$, etc. is shown schematically.

An arbitrary travel way 1, or if this is a travel way with multiple tracks, then a selected track of this travel way, is listed as "Track Number ABC".

In the column headed "Marking Number", the markings present along a travel way ABC_1 are listed in order and provided with the number 1 . . . k . . . N, for example. For instance, these markings are located at spacings of approximately 200 m and are aimed at precisely one preselected slot or one preselected tooth of the long stator 2 (FIG. 1).

In the column marked "Position" in FIG. 3, the map quadrants 15$i$, 15$j$ are listed, which are furnished by the particular navigation system and associated with the markings 1 . . . k . . . N. In the exemplary embodiment, the marking 1. is thus located in a map quadrant x_1, y_1, etc., while the marking N. is correspondingly located in the map quadrant x_N, y_N.

Finally, the list in FIG. 3 also has a column headed "Kilometer count", in which the precise spacings 1_1, 1_k . . . 1_N are indicated, which have the associated markings from a reference point, such as the starting point of the travel way 1.

The list in FIG. 3 thus includes all the data for the track or travel way ABC_1 that are necessary for defining or determining the location of the markings unambiguously. For instance, as the vehicle moves past the marking k. in FIG. 3 (or 9$i$ in FIG. 2), if the sensor 11 of the vehicle 7 indicates the existence of this marking, this can only mean that the vehicle 7 is located precisely in the associated map quadrant x_k, y_k (or 15$i$), or at kilometer 1_k. Conversely, for the case where the vehicle is located in the position x_k, y_k (or 15$i$ in FIG. 2) and a marking 9 is simultaneously detected, it is unambiguously clear that this can only be the marking k. in FIG. 3 (in other words, the marking 9$i$ in FIG. 2), since other markings are not present in the map quadrant x_k, y_k and 15$j$. It follows from this on the one hand that for precise ascertainment of the location of the vehicle 7, all that is needed is to detect the markings k. or 9$i$, 9$j$, etc.; that is, the markings k., 9$i$, 9$j$ need not additionally be provided with an encoding that indicates their precise position. On the contrary, for this detection a simple piece of yes/no information, for instance comprising only one bit ("marking present" or "marking absent") suffices. On the other hand, the navigation system used need not have high measurement accuracy, either. For the purposes of the invention, it suffices if each map quadrant x_k, y_k or 15$i$, 15$j$ is associated unambiguously to either no marking or to only a single marking k., 9$i$, 9$j$.

FIG. 4 schematically shows a sensor 11 (FIG. 1) mounted on the vehicle 7, with the transmitter 12, embodied here as a light source and in particular as a laser, and the receiver 14, embodied here as a photodetector (photodiode). Reference numeral 7$a$ indicates an outer wall of the vehicle 7 in FIG. 4.

The only part of the travel way 1 (not shown in detail) that is shown in FIG. 4 is one marking 9, which in operation of the vehicle 1 is passed by the vehicle in the direction of an arrow w. This marking 9 is embodied in the exemplary embodiment as a mirror oriented toward the vehicle 7. The positions of the markings 9, transmitter 12 and receiver 14 relative to one another are selected such that a beam of light or laser beam 16 emitted by the transmitted 12, as the vehicle 7 moves past, briefly strikes the marking 9, is reflected by its mirror surface to the receiver 14, and then in the receiver trips a sufficiently strong, for instance electrical, signal. This applies to all the markings 9$i$, 9$j$, etc. that are present along the travel way 1, so that during the trip, the sensor 11 outputs "marking present" signals at specified location intervals and time intervals.

So that these signals will be converted into exact position signals, the apparatus of the invention can be embodied for instance in accordance with FIG. 5. Accordingly, the receiver 14 is connected to an electrical evaluation circuit 17, which is embodied for instance as a microprocessor, computer, or the like. A receiver 18 of a local or global satellite-based navigation system is connected to the same evaluation unit 17, optionally via a block 19 in which the output signals of the receiver 18 are processed in a suitable way. A memory device 20 is also connected to the evaluation unit 17, and in it, the positions explained in terms of the list in FIG. 3 or present in that list are stored in memory. Finally, one output of the evaluation unit 17 is connected, in a manner known per se and not shown in detail, to a radio system 21 accommodated in the vehicle 7, from which system data can be exchanged between the vehicle 7 and a central control station (see for instance ZEVrail Glasers Annalen, special issue "Transrapid", October 2003, pp. 88 through 94, or "*Magnetbahn Transrapid— Die neue Dimension des Reisens*" ["Transrapid Maglev— The New Dimension in Travel"], Hestra-Verlag Darmstadt, pp. 60 through 68).

The mode of operation of the apparatus in FIG. 5, using conventional electronic data processing means, is essentially as follows:

With the transmitter 12 preferably permanently on, the vehicle 7 successively passes the markings 9 mounted along the travel way 1. Each time it passes such a marking 9, the receiver 14 of the sensor 11 outputs a signal, for instance an electrical signal, "marking present" that indicates the detection of a marking 9, and this signal is delivered to the evaluation unit 17. The evaluation unit 17 is furthermore supplied permanently with current location signals by the receiver 18 of the navigation system, and these signals provide information as to which map quadrant 15 (FIG. 2) the vehicle 7 is located in at that precise time. If the detection of a marking 9 is signalled, the evaluation unit 17 compares the associated current location signals with the position data stored in the memory device 20. From this comparison, a position signal is then generated, which provides information about the marking 9 actually passed and the exact location of the vehicle 7 associated with it, and which is carried to the central control station via the radio system 21.

The invention has multiple advantages. Among others, it is advantageous that the markings 9 need not be encoded in order to furnish precise location signals, which simplifies the production and assembly of the markings 9 substantially and substantially increases the signal-to-noise ratio. Moreover, commercially available components, which are often used in the automotive field for instance and are therefore inexpensive, can be used for the receiver 18 of the navigation system. Instead of a global navigation system, it is advantageously also possible to provide local navigation systems, serving the purpose of operating only one magnetic levitation railway or the like, for instance, that are independent of global navigation systems. In principle, one-dimensional navigation systems suffice for this purpose and moreover can be arranged for reception in tunnels, for instance at the beginning and end of each tunnel. Moreover, the receiver 18 of the navigation system operates independently of the travel way 1, so that it can be accommodated anywhere in the vehicle 7 and does not take up space in the vicinity of the travel way 1. Finally, the danger of reading mistakes in reading out the markings 9 is extremely low, since the markings 9 merely need to be detected but not identified by the sensor 11.

The invention is not limited to the exemplary embodiments described, which can be modified in manifold ways. This is true for instance for the sensor 11. As an alternative to FIG. 4, as shown in FIG. 6 in a second exemplary embodiment, it can have a mirror 22 which is fixedly installed in the vehicle 7 and which permanently reflects the beam of light 16, emitted by the transmitter 12, to the receiver 14. In that case, components that interrupt the beam of light 16 are provided as the markings 23 and are located along the travel way 1 such that as the vehicle 7 moves past them, they pass a gap between the mirror 22 and the transmitter 12 and/or receiver 14 and as a result briefly interrupt the beam of light 16. The presence of a marking 23 is indicated in this case by the interruption of the beam of light 16 at the receiver 14, rather than by its appearance there. Alternatively, however, inductive and other kinds of combinations of sensors and markings may be provided. Finally, it is understood that the various characteristics can also be used in other combinations than those described and shown.

The invention claimed is:

1. An apparatus located on a rail-bound vehicle (7) generates position signals, which indicate the position of the rail-bound vehicle (7) along a travel way (1), including many markings (9, 23), located along the travel way (1), at least one sensor (11), for scanning the markings (9, 23) and outputting signals thus ascertained, and an evaluation unit (17), connected to the at least one sensor (11), for generating the position signals by evaluating the signals generated by the markings (9, 23); wherein the markings (9, 23) are embodied such that when the rail-bound vehicle (7) passes a marking (9, 23), the sensor (11) outputs a "marking present" signal and otherwise outputs a "marking absent" signal; wherein the rail-bound vehicle (7) has a receiver (18) of a navigation system configured, for outputting current location signals and which is connected to the evaluation unit (17); wherein the evaluation unit (17) is connected to a memory device (20), in which position data associated with the markings (9, 23) are pre-stored; and wherein the evaluation unit (17), upon receiving each "marking present" signal, outputs a position signal associated with the marking (9, 23) on the basis of a comparison of the current location signal with the pre-stored position data.

2. The apparatus as defined by claim 1, characterized in that the sensor (11) includes a transmitter (12) that transmits a beam of light (16) and a receiver (14) for the beam of light (16), and the markings (9) are embodied as mirrors, which when the vehicle (7) passes them deflect the beam of light (16), generated by the transmitter (12), to the receiver (14).

3. The apparatus as defined by claim 2, characterized in that the light source includes a laser.

4. The apparatus as defined by claim 1, characterized in that the sensor (11) includes a transmitter (12) transmitting a beam of light (16), a receiver (14) for the beam of light (16), and a mirror (22) that deflects the beam of light (16), generated by the transmitter (12), to the receiver (14); and that the markings (23) are embodied as components that interrupt the beam of light (16).

5. The apparatus as defined by claim 1, characterized in that the evaluation unit (17) is connected to a radio system (21) mounted on the vehicle (7).

6. A system for automatically tracking a rail location of a rail-bound vehicle, comprising:
  apparatus located on the rail-bound vehicle generates position signals that indicate a position or rail location of the rail-bound vehicle along a travel way throughout which multiple position markings are arranged, the apparatus including:
    at least one sensor configured for scanning the position markings and outputting signals as the rail-bound vehicle moves past the position markings arranged along the travel way; and
    an evaluation unit connected to the sensor and a memory device with pre-stored position data associated with the position markings, the evaluation unit generating the position signals by evaluating the signals output by the at least one sensor when scanning the position markings in view of the pre-stored position data; and
  a receiver of a navigation system, which is connected to the evaluation unit, for outputting current location signals;
  wherein, when the vehicle passes a position marking, the at least one sensor outputs a "marking present" signal and otherwise outputs a "marking absent" signal and wherein the evaluation unit, upon receiving each "marking present" signal, outputs a position signal associated with the position marking based on a comparison of a current location signal generated by the navigation system receiver and the position data pre-stored in the memory device.

* * * * *